Patented May 17, 1938

2,117,777

UNITED STATES PATENT OFFICE 2,117,777

DOUBLE SALTS OF CALCIUM ASCORBATE WITH CALCIUM SALTS OF OTHER POLY-HYDROXY - MONO - CARBOXYLIC ACIDS AND PROCESS OF MAKING THEM

Kurt Warnat, Basel, Switzerland, assignor to Hoffman-La Roche, Inc., Nutley, N. J., a corporation of New Jersey No Drawing. Application December 27, 1937, Serial No. 182,022. In Switzerland January 8, 1937

6 Claims. (Cl. 260—112)

The conversion of therapeutically valuable organic calcium salts, such as, for instance, calcium gluconate, which are themselves difficultly soluble in water, into double compounds easily soluble in water by combination with calcium salts of bionic acids is well-known (German Patent 594,752). This process has the disadvantage that the calcium content of the double compound is considerably lower than that of the therapeutically important calcium gluconate. Whereas anhydrous calcium gluconate possesses a calcium content of 9.3%, the double salt of calcium gluconate and calcium lactobionate has a calcium content of 6.7 per cent.

It has now been found that therapeutically particularly valuable calcium double compounds which are easily soluble can be obtained by causing calcium salts of polyoxy-mono-carboxylic acids to react with calcium ascorbate. The process has two advantages: An ascorbic acid therapy can be combined with a thorough calcium therapy without having to dispense the valuable ascorbic acid in uneconomically large quantities which are eventually excreted from the body. It is thus possible to administer about double the quantity of calcium than is the case if calcium ascorbate is taken alone. The second advantage of the process is that calcium salts, such as calcium gluconate, which are in themselves valuable, can be made easily soluble in water by addition of the vitally important ascorbic acid without lowering the calcium content.

Gluconic acid, mannonic acid, quinic acid etc. can be used as poly-oxy-mono-carboxylic acids.

The formation of the double compounds is brought about by heating or by causing the components to react for some time at temperatures around 0° C. The calcium salts are obtained from their solutions by evaporation or precipitation with organic solvents miscible with water, such as alcohol. The solutions of the double compounds obtained can be directly used for injection purposes. The process must obviously be carried out with care and precautions taken to prevent access of air as far as possible on account of the lability of ascorbic acid.

The solubility of the new double salts is far greater than that of equimolecular mixtures. If 4.3 grams of anhydrous calcium gluconate are shaken with 3.9 grams of calcium ascorbate in 50 cc. of water for half-an-hour, about 2.6 grams of calcium gluconate remain undissolved. On the other hand 5 grams of the new double compound dissolve in 10 cc. of cold water.

*Example 1*

43 parts by weight of anhydrous calcium gluconate and 39 parts by weight of calcium ascorbate are dissolved in 200 parts by weight of water while heating. No crystallization takes place on cooling. Slight impurities are filtered off and the double compound precipitated by the addition of 400 to 500 parts by weight of alcohol. On continuing to triturate with alcohol the double compound soon solidifies. It forms a white, granular powder. Calcium content of the dry double compound is 9.7%.

*Example 2*

17.6 parts by weight of ascorbic acid and 19.2 parts by weight of quinic acid are heated in 50 parts by weight of water with 10 parts by weight of calcium carbonate. The double compound is precipitated by the addition of alcohol and forms a white powder. Calcium content of the dry double compound is 9.8 to 9.9%.

*Example 3*

Equimolecular quantities of gluconic acid, ascorbic acid and calcium hydroxide are heated in water for a short time only. The calcium salts of gluconic acid and ascorbic acid formed initially are converted into the double compound, which can be precipitated with alcohol or filled into ampoules and directly used for injection.

*Example 4*

54 parts by weight of hydrated calcium quinate, 35.2 parts by weight of ascorbic acid and 10 parts by weight of calcium carbonate are heated in 150 parts by weight of water. By the addition of alcohol the double compound is obtained and soon solidifies to a granular mass.

*Example 5*

43 parts by weight of anhydrous calcium gluconate and 39 parts by weight of calcium ascorbate are shaken in 200 parts by weight of water in absence of air until a solution is obtained. As soon as the whole has gone into solution the double compound can be isolated in the solid state or used in solution for injection purposes.

I claim:

1. Easily water-soluble double salts of calcium salts of poly-hydroxy-mono-carboxylic acids and calcium ascorbate.

2. The easily water-soluble double salt of calcium gluconate and calcium ascorbate.

3. The easily water-soluble double salt of calcium quinate and calcium ascorbate.

4. The process for the manufacture of easily water-soluble calcium double salts of ascorbic acid which comprises the action of equimolecular quantities of calcium salts of poly-hydroxy-mono-carboxylic acids on calcium ascorbate in aqueous solution.

5. The process for the manufacture of an easily water-soluble calcium double salt of ascorbic acid which comprises the action of equimolecular quantities of calcium gluconate on calcium ascorbate in aqueous solution.

6. The process for the manufacture of an easily water-soluble calcium double salt of ascorbic acid which comprises the action of equimolecular quantities of calcium quinate on calcium ascorbate in aqueous solution.

KURT WARNAT.